United States Patent
Fadavi-Ardekani et al.

(10) Patent No.: US 6,499,087 B1
(45) Date of Patent: Dec. 24, 2002

(54) SYNCHRONOUS MEMORY SHARING BASED ON CYCLE STEALING

(75) Inventors: Jalil Fadavi-Ardekani, Orefield, PA (US); Bahram Kermani, Whitehall, PA (US); Walter G. Soto, Irvine, PA (US); Richard J. Niescier, Lower Saucon Valley, PA (US); Fan You, Basking Ridge, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/093,859

(22) Filed: Jun. 9, 1998

Related U.S. Application Data

(60) Provisional application No. 60/065,855, filed on Nov. 14, 1997.

(51) Int. Cl.[7] .............................................. G06F 13/18
(52) U.S. Cl. ........................ 711/151; 711/150; 711/158; 710/244
(58) Field of Search ................................. 711/151, 158, 711/163, 167, 149, 150; 710/37, 40, 41, 240, 241, 242, 244, 113, 116, 117

(56) References Cited

U.S. PATENT DOCUMENTS

| | | | | |
|---|---|---|---|---|
| 3,967,246 A | * | 6/1976 | House ........................ 711/151 |
| 5,021,950 A | * | 6/1991 | Nishikawa ................... 710/119 |
| 5,134,613 A | * | 7/1992 | Virzi et al. .................. 370/463 |
| 5,179,667 A | * | 1/1993 | Iyer ............................ 711/167 |
| 5,752,010 A | * | 5/1998 | Herbert ....................... 345/509 |
| 5,784,582 A | * | 7/1998 | Hughes ....................... 710/117 |
| 5,845,139 A | * | 12/1998 | Fischer et al. .............. 713/324 |
| 5,867,180 A | * | 2/1999 | Katayama et al. .......... 345/512 |
| 5,872,936 A | * | 2/1999 | Eckstein ..................... 710/107 |
| 5,920,894 A | * | 7/1999 | Plog et al. .................. 711/151 |
| 5,987,574 A | * | 11/1999 | Paluch ........................ 711/158 |
| 5,996,051 A | * | 11/1999 | Mergard ..................... 711/147 |
| 6,163,831 A | * | 12/2000 | Kermani ..................... 711/150 |
| 6,263,425 B1 | * | 7/2001 | Falik .......................... 712/228 |

* cited by examiner

*Primary Examiner*—Gary J Portka
(74) *Attorney, Agent, or Firm*—William H. Bollman

(57) ABSTRACT

A multiple agent system providing each of a plurality of agents, i.e., processors, access to a shared synchronous memory. A super agent is preferably that agent from among a plurality of agents which accesses a shared synchronous memory most frequently. The super agent has direct access to the shared synchronous memory, without negotiation and/or arbitration, while the non-super agents access the shared synchronous memory under the control of an arbiter-and-switch. Open windows are generated when the super agent is not, accessing the shared synchronous memory. The non-super agents can be allowed interim access to the shared synchronous memory even, before the super agent terminates ownership of the shared synchronous memory.

18 Claims, 5 Drawing Sheets

SYNCHRONOUS MEMORY SHARING BASED ON CYCLE STEALING

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to the shared usage of synchronous memory by a plurality of agents, i.e., processors.

2. Background of Related Art

With the ever-increasing speeds of today's processors, memory designs have attempted to meet the required speed requirements. For instance, synchronous memory such as static random access memory (SRAM) and dynamic random access memory (DRAM) are commonly available synchronous types of memory.

Synchronous memory technology is currently used in a wide variety of applications to close the gap between the needs of high-speed processors and the access time of a synchronous memory such as dynamic random access memory (DRAM). Synchronous memory, e.g., SDRAM technology, combines industry advances in fast dynamic random access memory (DRAM) with a high-speed interface.

Functionally, an SDRAM resembles a conventional DRAM, i.e., it is dynamic and must be refreshed. However, the SDRAM architecture has improvements over standard DRAMs. For instance, an SDRAM uses internal pipelining to improve throughput and on-chip interleaving between separate memory banks to eliminate gaps in output data.

The idea of using a SDRAM synchronously (as opposed to using a DRAM asynchronously) emerged in light of increasing data transfer demands of high-end processors. SDRAM circuit designs are based on state machine operation instead of being level/pulse width driven as in conventional asynchronous memory devices. In addition, synchronous memory access techniques improve the margin to system noise because inputs are not level driven. Instead, the inputs are latched by the system clock. Since all timing is based on the same synchronous clock, designers can achieve better specification margins. Moreover, since the SDRAM access is programmable, designers can improve bus utilization because the processor can be synchronized to the SDRAM output.

The core of an SDRAM device is a standard DRAM with the important addition of synchronous control logic. By synchronizing all address, data and control signals with a single clock signal, SDRAM technology enhances performance, simplifies design and provides faster data transfer.

Similar advantages hold for other types of synchronous memory, e.g., synchronous SRAM (SSRAM) or even synchronous read only memory (ROM).

Synchronous memory requires a clock signal from the accessing agent to allow fully synchronous operation with respect to the accessing agent. If more than one agent is given access to a shared synchronous memory, each agent must conventionally supply its own clock signal to the synchronous memory. Unfortunately, the clock signals from separate agents are not conventionally synchronous or in phase with one another. Therefore, as the synchronous memory shifts from the use of one clock signal to another, delays or wait states must be added before the new agent's clock signal can be used to access the synchronous memory. Moreover, arbitration schemes between a plurality of agents for conventional memory systems evidences that the performance of one agent may suffer more than another agent sharing the same memory, particularly if the memory accesses are disproportionately distributed among the accessing agents.

Some synchronous memory devices have the capability to provide burst input/output (I/O), particularly for the optimization of cache memory fills at the system frequency. Advanced features such as programmable burst mode and burst length improve memory system performance and flexibility in conventional synchronous memories, and eliminate the need to insert wait states, e.g., dormant clock cycles, between individual accesses in the burst.

Conventional SRAM devices include independent, fixed memory sections that can be accessed individually or in an interleaved fashion. For instance, two independent banks in an SRAM device allow that device to have two different rows active at the same time. This means that data can be read from or written to one bank while the other bank is being precharged. The setup normally associated with precharging and activating a row can be hidden by interleaving the bank accesses.

FIG. 6 shows a conventional un-shared synchronous memory system having a single agent A and a synchronous memory, e.g., SRAM 502. The single agent A communicates with the synchronous memory using appropriate address, data and control buses (ADC) 506, and one or more clock signals 504. Because the synchronous memory 502 has only the single accessing agent A, the synchronous memory 302 needs only to contend with access from a single source.

Unfortunately, systems utilizing a plurality of agents conventionally include separate memory systems for each agent, causing wasted memory resources in the event that one or more agents are not fully utilizing their available memory.

There is thus a need for synchronous memory systems which allow efficient use of synchronous memory resources by a plurality of agents.

SUMMARY OF THE INVENTION

In accordance with the principles of the present invention, a shared synchronous memory system comprises a super agent, at least one non-super agent, and a shared synchronous memory. An arbiter-and-switch allows the super agent unarbitrated access to the shared synchronous memory and allows the non-super agent an open window of access to the shared synchronous memory when the super agent is not accessing the shared synchronous memory.

A method of sharing synchronous memory among a plurality of agents in accordance with another aspect of the present invention comprises the assignment of one of a plurality of agents with super agent status and the others of the plurality of agents with non-super agent status. The super agent is allowed to access a shared synchronous memory without arbitration, and the non-super agents arbitrate for access to the shared synchronous memory.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a variety of techniques used to allow a plurality of agents to share a common synchronous memory.

Figure 1:
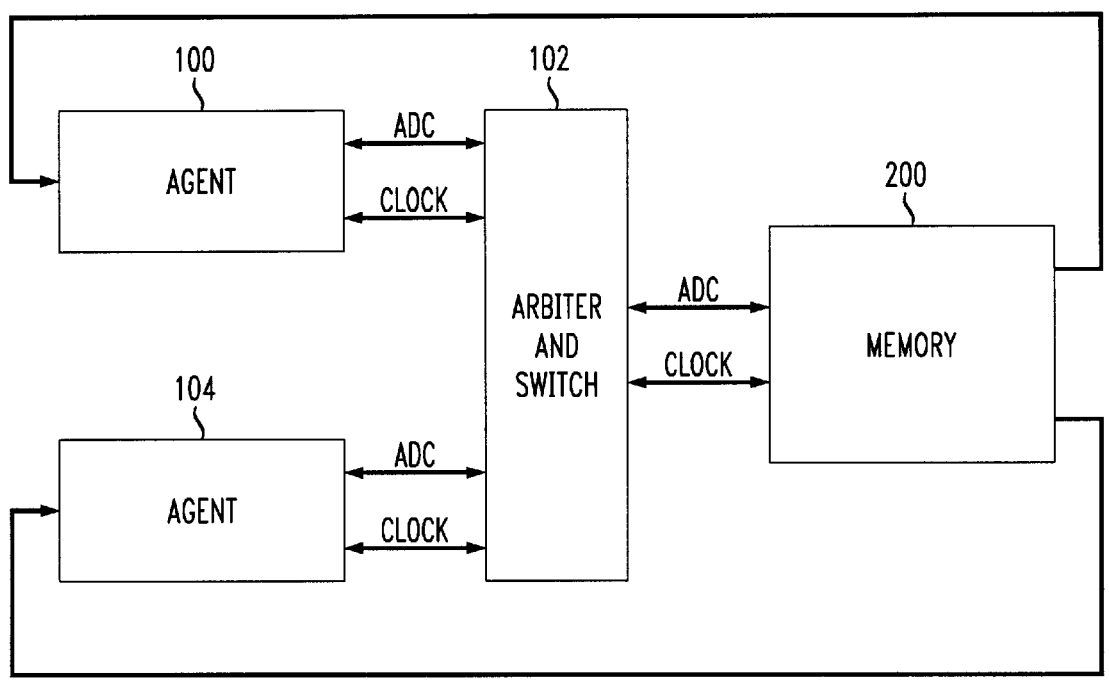
FIG. 1 shows a basic block diagram of a plurality of agents sharing a common synchronous memory in accordance with the principles of the present invention.

FIG. 1 shows a basic block diagram of a plurality of agents 100 and 104 sharing a common synchronous memory 200 in accordance with the principles of the present invention. The specific embodiments disclosed relate to SSRAM, but the principles of the present invention relate equally to all types of synchronous memory.

In particular, each of the plurality of agents 100, 104 may be any suitable processing element, e.g., a digital signal processor (DSP), on-demand transfer (ODT) engine, microprocessor or microcontroller. Moreover, one of the agents can be a master processor in a multi-processor system, and the other agents can be slave peripheral devices or co-processors.

An arbiter-and-switch 102 allows one of the plurality of agents 100 or 104 to access the shared synchronous memory 200 at any one time. The arbiter-and-switch 102 switches the address, data and control buses and the clock signal(s) of the selected agent 100 or 104 to the respective address, data and control buses and clock signal(s) of the shared synchronous memory 200 when appropriate. The arbiter-and-switch 102 is adapted and arranged to prevent glitches or erroneous clock signals from being presented to the shared synchronous memory 200.

In accordance with the principles of the present invention, one of the plurality of agents, e.g., agent 100 is designated as a super agent, and all other agents, e.g., agent 104, as non-super agents. A super agent is preferably that agent from among the plurality of agents which accesses the shared synchronous memory most frequently and/or has the most critical timing requirements.

Although the general block diagram of FIG. 1 depicts the address, data and control buses and the clock signal(s) of all agents as passing through the arbiter-and-switch 102, it is within the principles of the present invention as will be discussed in more detail herein below to designate one of the plurality of agents as a super agent and allowing that super agent to communicate with the shared synchronous memory 200 without requiring that super agent to arbitrate for ownership of the shared synchronous memory 200. In this case, all other agents would monitor the super agent's communications with the shared synchronous memory 200.

Figure 2:
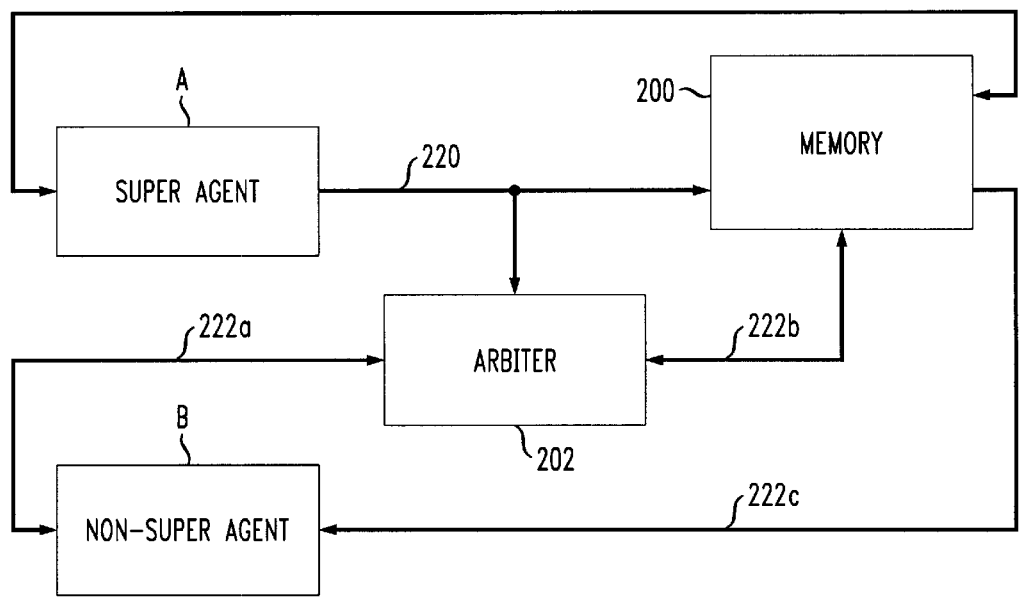
FIG. 2 shows a plurality of agents including a super agent and a non-super agent wherein the super agent is provided uninhibited access to shared synchronous memory.

For instance, FIG. 2 shows a plurality of agents including a super agent A and a non-super agent B wherein the super agent A is allowed to communicate with the shared synchronous memory 200 without arbitration.

In particular, FIG. 2 shows a shared synchronous memory 200 which is accessible by both a-super agent A and a non-super agent B. The super agent A has direct access to the shared synchronous memory 200, while the non-super agent B accesses the shared synchronous memory 200 under the control of an arbiter-and-switch 102. Thus, the super agent A requests access to the shared synchronous memory 200 directly via a communication path 220, while the non-super agent B requests access to the shared synchronous memory 200 via the arbiter-and-switch 202 using communication paths 222a, 222b and 222c.

The arbiter-and-switch 102 monitors accesses by the super agent A to the shared synchronous memory 200, e.g., to determine open windows wherein the super agent A would not be affected by an access to the shared synchronous memory 200 by another agent. The non-super, agent B can submit memory request signals to the arbiter-and-switch 102 at any time. However, for this non-super agent B, ownership of the shared synchronous memory is granted on a cycle-by-cycle basis of the clock signal only when access by the super agent A is not necessary.

The arbiter-and-switch 202 implements predetermined rules with respect to access provided to the shared synchronous memory 200 by the non-super agent B. The predetermined rules provide that the super agent A is provided transparent access to the shared synchronous memory 200, i.e., whenever desired. Thus, the super agent A is provided access to the 'shared synchronous memory 200 without arbitration and/or negotiation.

Arbitration from among a plurality of non-super agents may be on a first-come, first-served basis, on a priority basis, or other suitable decisive decision criteria by the arbiter-and-switch 202 in accordance with the principles of the present invention.

For instance, the winning non-super agent may be provided time division multiplexed access to the shared synchronous memory. Using this technique, each non-super agent B is assigned a constant time interval for access when the super agent A is not accessing the shared synchronous memory 200. When the super agent A is not accessing the shared synchronous memory 200, an open window is generated allowing the other, non-super agents B free access to the shared synchronous memory in accordance with time slots determined by a free-running clock. If an open window is not available when a request is made by a non-super agent B, the arbitrated non-super agent must wait until an open window becomes available to access the shared synchronous memory 200.

Open windows exist when the super agent A is not accessing the shared synchronous memory 200. However, an open window may also exist when the super agent A has initiated an access to the shared synchronous memory 200 but has stalled or extended its access for other reasons, e.g., when wait states are generated due to an access to external memory, bus conflict or other reason. During the extended period and/or wait states, the shared synchronous memory 200 may be given interim access by a non-super agent B. A halt or power down signal in the super agent A may also cause a significant clock extension, allowing extended interim use of the shared synchronous memory 200 by the non-super agents. This interim use of the shared synchronous memory 200 during selected cycles (e.g., wait states)

during the super agent A's ownership of the shared synchronous memory is referred to as adaptive instruction cycle stealing or cycle stealing. It is adaptive in the sense that the interim access granted to non-super agents adapts to the length of the extended access by the super agent A.

One or more non-super agents may access the shared synchronous memory during any one open window, depending upon the number of free-running clock cycles in each open window.

Figure 3:
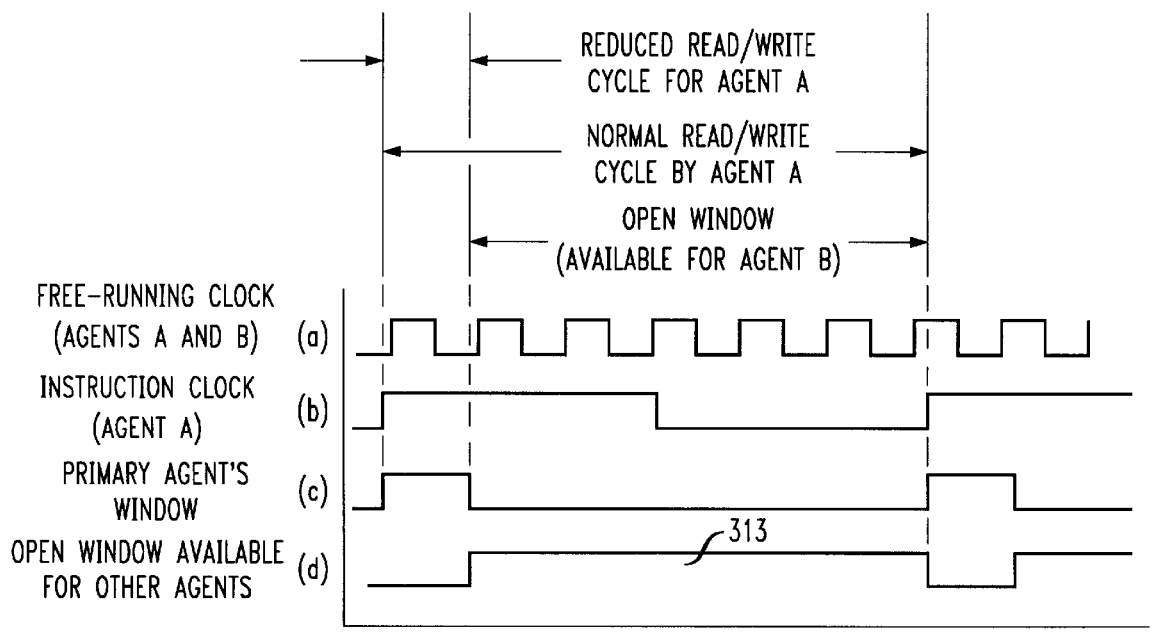
FIG. 3 shows an open window generated between accesses to the shared synchronous memory by a super agent.

FIG. 3 shows an interim open window of the adaptive instruction cycle stealing technique wherein an open window is generated even when an access to the shared synchronous memory by the super agent has not yet terminated, e.g., during wait states in an extended access lasting more than a single memory clock cycle.

In particular, waveform (a) of FIG. 3 shows the free-running clock signal with respect to both the super agent A and the non-super agent B. Waveform (b) shows an extended instruction cycle of the super agent A. Waveform (c) shows the time required for access to the shared synchronous memory 200, i.e., one clock cycle of the free-running clock signal shown in waveform (a). The remainder of the time during the access by the super agent A results in an open window 313 shown in waveform (d).

Thus, in accordance with the principles of the present invention, non-super agents arbitrate for ownership and access to the shared synchronous memory 200 during open windows of time, either between accesses by a super agent or in the interim during an extended access by the super agent A. Interim open windows can be combined with open windows generated between accesses by the super agent to form larger access windows for use by one or more non-super agents.

To access the shared synchronous memory 200 from a non-super agent B while the super agent A is in an extended access, each of the agents A, B are preferably provided with a different output latch in the shared synchronous memory 200 to avoid overwriting of data accessed by another agent.

The open window is not limited to a single cycle. For instance, in general, if a cycle extension of a memory request from the super agent A lasts for N cycles, the first cycle might be used by the super agent A to access the shared synchronous memory 200, while an open window having a length of N−1 cycles of the free-running clock would be generated for use by the non-super agents, e.g., non-super agent B.

Use of open windows in a super agent's accesses to shared synchronous memory in accordance with the principles of the present invention can provide significant increases in the performance of the overall system, particularly with respect to the super agent A. For example, in one example wherein the super agent is a DSP, the performance of the DSP as measured by million instructions per second (MIPS) can be increased by approximately 30% or more, depending upon the particular application.

Figure 4:
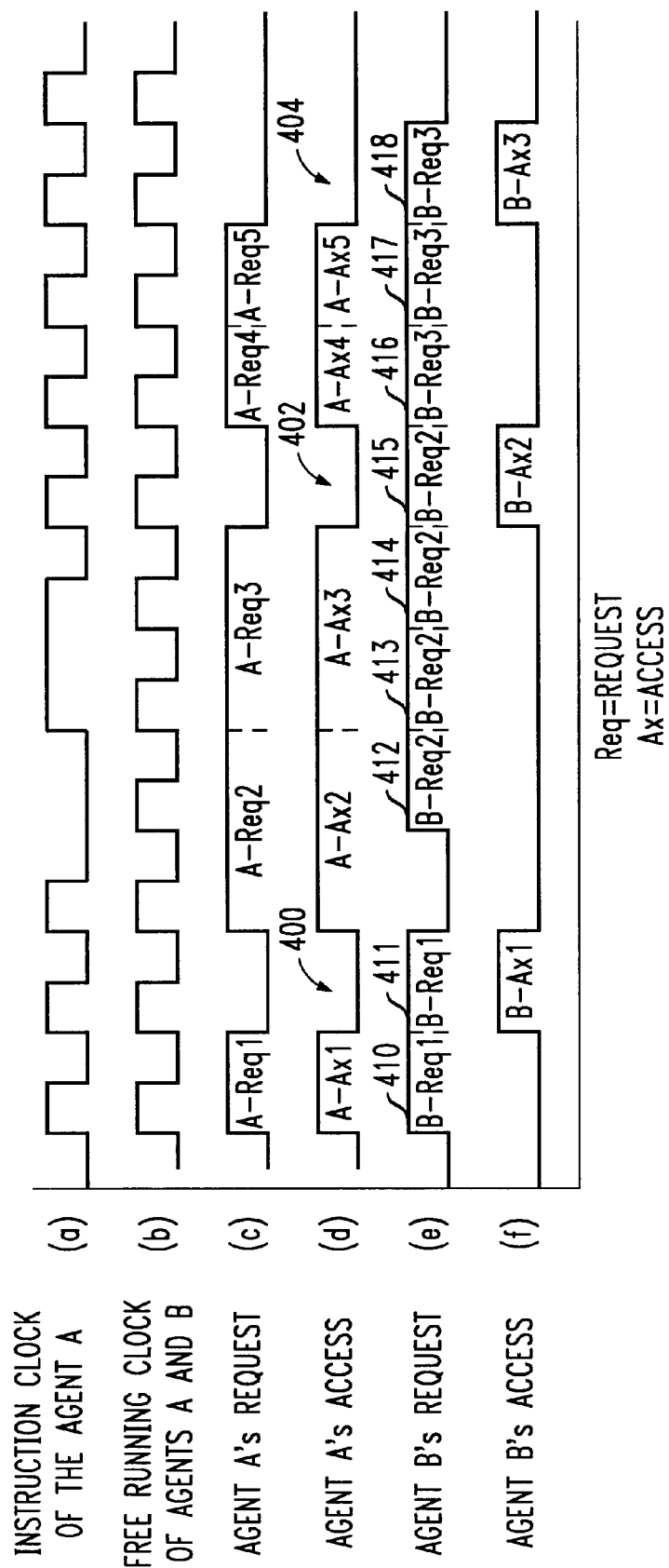
FIG. 4 shows memory request signals relating to the sharing of a synchronous memory by a super agent and a non-super agent.
Figure 5:
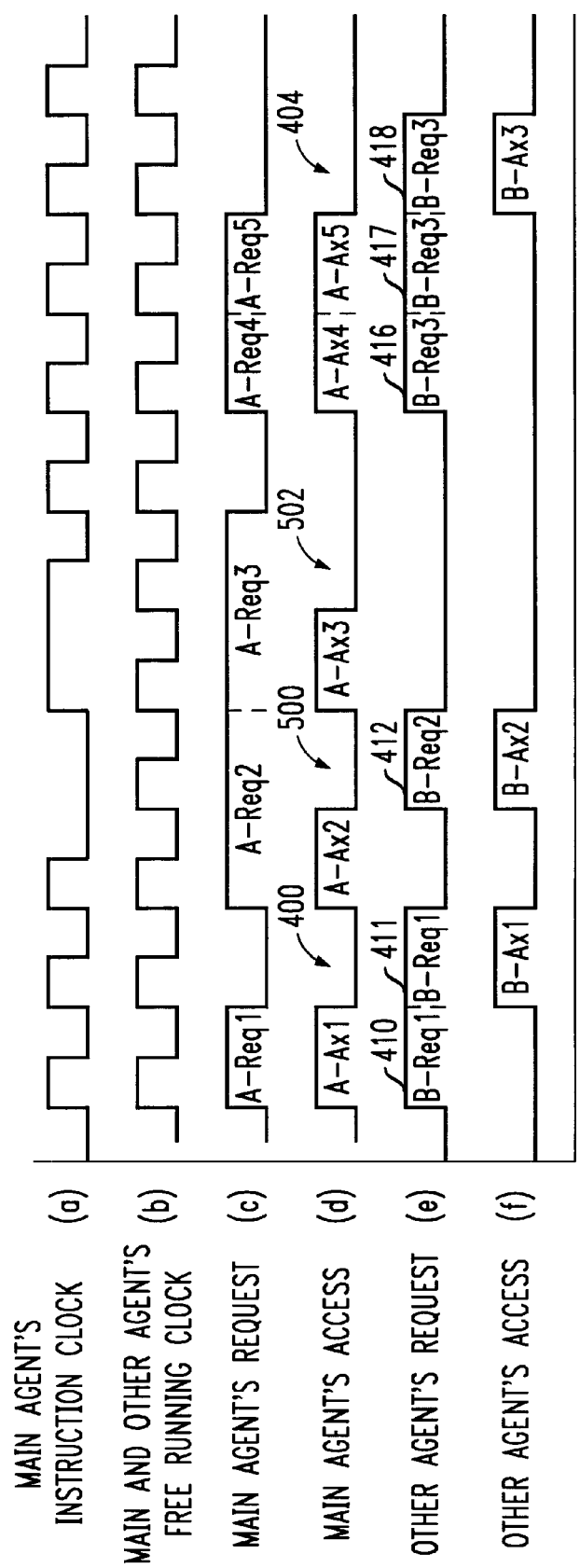
FIG. 5 shows memory request signals relating to the sharing of a synchronous memory by a super agent and a non-super agent in accordance with another aspect of the present invention.
Figure 6:
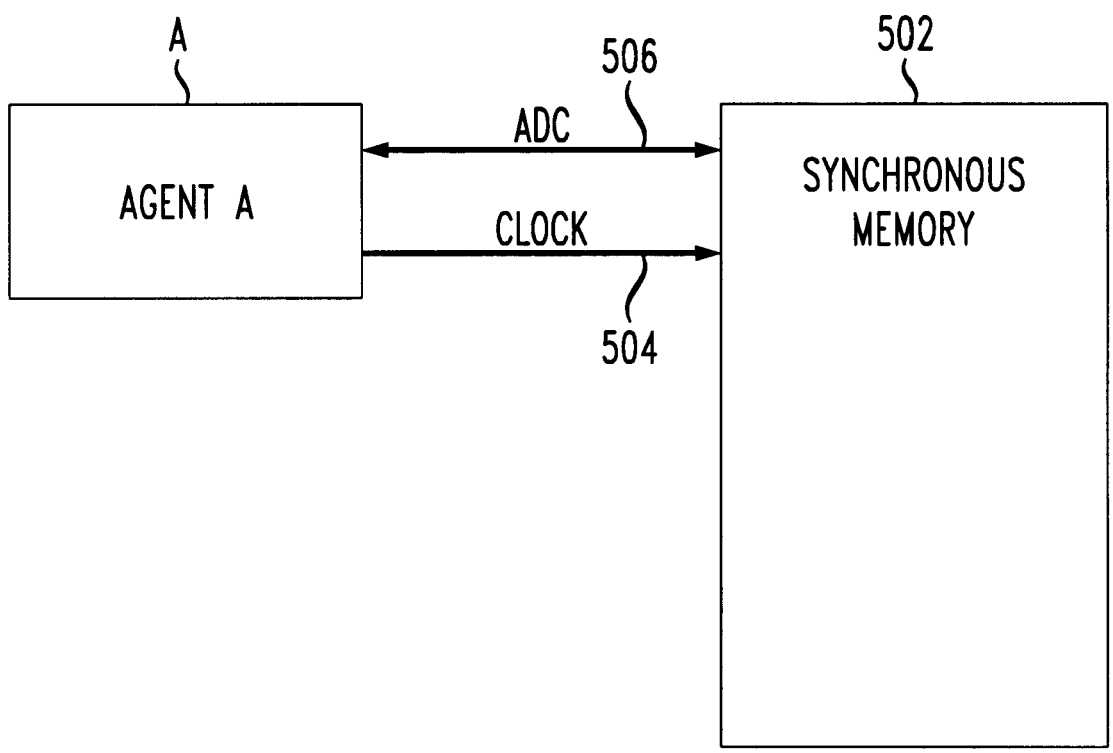
FIG. 6 shows a conventional un-shared synchronous memory system having a single agent.

FIG. 4 shows in more detail an example of the granting of memory access requests to a non-super agent B during open windows between separate memory accesses by a super agent A, and FIG. 5 shows in more detail the same example but allowing non-super agents to access the shared memory during interim open windows generated within extended accesses by the super agent, both in accordance with the principles of the present invention.

In particular, waveform (a) of FIG. 4 shows an example of an instruction clock cycle of a super agent A, and waveform (b) shows the free-running clock on which the accesses to the shared synchronous memory 200 are based.

The super agent A outputs in sequence five memory access requests A-Req1, A-Req2, A-Req3, A-Req4 and A-Req5, as shown in waveform (c) of FIG. 4. The first memory access request A-Req1 has a length of one clock cycle, the second and third memory access requests A-Req2 and A-Req3 each have a length of two clock cycles, and the fourth and fifth memory access requests A-Req4 and A-Req5 each have a length of one clock cycle.

Waveform (d) shows the granting of five accesses A-Ax1, A-Ax2, A-Ax3, A-Ax4 and A-Ax5 to the super agent, A's memory access requests at the time and for the number of clock cycles corresponding to the respective memory access requests A-Req1, A-Req2, A-Req3, A-Req4 and A-Req5. However, in accordance with the principles of the present invention, open windows are formed between the separate accesses by the super agent A. In particular, a first open window 400 is formed between the first and second memory accesses A-Ax1 and A-Ax2 of the super agent A, a second open window 402 is formed between the third and fourth memory accesses A-Ax3 and A-Ax4 and a third open window 404 is formed after the fifth memory access A-Ax5.

Waveform (e) shows an example memory request sequence by a non-super agent B to access the shared synchronous memory 200, e.g., three times. In particular, the non-super agent B first requests access to the shared synchronous memory at 410. However, the super agent A requests access to the shared synchronous memory 200 during the same clock cycle, and thus the non-super agent B is not provided an acknowledgment to access the shared synchronous memory 200 during that clock cycle. Thus, the non-super agent B repeats the memory access request at 411 in the next clock cycle, which occurs during the first open window 400. Accordingly, as shown in waveform (f) of FIG. 4, the non-super agent B is granted access to the shared synchronous memory 200 for no more than one clock cycle, i.e., the length of the open window.

Similarly, the non-super agent B again requests access to the shared synchronous memory 200 at 412, but is not given access because the super agent is utilizing the shared synchronous memory during that clock cycle. The non-super agent B thereafter requests access to the shared synchronous memory 200 again at 413 and 414 until it is finally granted access B-Ax2 as shown in waveform (f) during the second open window 402 pursuant to its fourth repeated memory access request B-Req2 at 415 as shown in waveform (e).

Likewise, it takes three memory access requests B-Req3 at 416, 417 and 418 before the non-super agent B is finally granted access B-Ax3 as shown in waveform (f) to the shared synchronous memory 200 in the third open window 404 as shown in waveform (d).

FIG. 5 shows that the non-super agents, e.g., non-super agent B, can be allowed interim access to the shared synchronous memory 200 even before the super agent A terminates ownership of the shared synchronous memory 200.

In particular, waveforms (a), (b) and (c) in FIG. 5 are as shown and described with respect to FIG. 4. However, as shown in FIG. 5, although the memory access requests from the super agent A such as the second memory access request A-Req2 may last for more than a single clock cycle, access is provided to the super agent for a shorter period of time, e.g., for only one clock cycle. Thus, as shown in waveform (d) of FIG. 5, the second and third accesses A-Ax2 and A-Ax3 of the super agent A are shortened to only one clock cycle each, forming a new open window at 500 and an extended open window at 502. Accordingly, as shown in waveform (e), the second memory access request B-Req2 as shown in waveform (e) of the non-super agent B gains access B-Ax2 as shown in waveform (f) after only the first try, as opposed to four repeated tries 412–415 as shown in waveform (e) of FIG. 4.

Thus, in accordance with the principles of the present invention, one of a plurality of agents accessing a shared synchronous memory is given a super agent priority. The super agent can access the shared synchronous memory without negotiation and/or arbitration. However, the remaining non-super agents can access the memory only when it is available, i.e., when the shared synchronous memory is not being used by the super agent.

The use of a super agent/non-super agent distinction between a plurality of agents accessing a shared synchronous memory improves upon the degraded performance otherwise experienced by the overall system and in particular the super agent because of the overhead inherent in an arbitration process. With higher priority, the super agent is given access to the shared synchronous memory whenever requested and can thus access the shared synchronous memory without halting its operation.

The present invention has particular application in shared memory systems wherein it is preferred that a main agent access a shared synchronous memory without interruption or disruption. Moreover, for high traffic memory accesses where the super agent is repeatedly accessing shared memory, non-super agents can still gain access to the shared memory if the super agent's access is extended.

While the invention has been described with reference to the exemplary embodiments thereof, those skilled in the art will be able to make various modifications to the described embodiments of the invention without departing from the true spirit and scope of the invention.

What is claimed is:

1. A shared synchronous memory system comprising:
   a super agent;
   at least one non-super agent;
   a shared synchronous memory; and
   an arbiter-and-switch adapted and arranged to individually route address, data and clock signals from said super agent and said at least one non-super agent to said shared synchronous memory, said arbiter-and-switch being adapted and arranged to allow said super agent direct, unarbitrated access to said shared synchronous memory, and to allow said at least one non-super agent an open window of access to said shared synchronous memory, wherein said open window may exist when said super agent is not accessing said shared synchronous memory, when said super agent's access to said shared synchronous memory has stalled, when a bus conflict exists, and when a halt or power down signal exists in said super agent;
   wherein said arbiter-and-switch monitors said super agent's access to said shared synchronous memory for a determination of availability of said open window.

2. The shared synchronous memory system according to claim 1, wherein:
   said open window of access to said shared synchronous memory is between separate accesses by said super agent to said shared synchronous memory.

3. The shared synchronous memory system according to claim 1, wherein:
   said open window of access to said shared synchronous memory is during an extended access by said super agent to said shared synchronous memory.

4. The shared synchronous memory system according to claim 3, wherein:
   said extended access is caused by wait states.

5. The shared synchronous memory system according to claim 3, wherein:
   said extended access is caused by a power down mode of said super agent.

6. The shared synchronous memory system according to claim 3, wherein:
   said extended access is caused by a halt mode of said super agent.

7. The shared synchronous memory system according to claim 3, wherein:
   said extended access includes one memory cycle access time and an open window having a length of n−1 cycles, wherein n corresponds to a number of memory cycles corresponding to a length of said extended access.

8. The shared synchronous memory system according to claim 1, further comprising:
   a first memory output port corresponding to said super agent; and
   at least another memory output port corresponding to said at least one non-super agent.

9. A method of sharing synchronous memory among a plurality of agents, said method comprising:
   assigning one of said plurality of agents super agent status;
   assigning the others of said plurality of agents non-super agent status;
   allowing said super agent to access directly a shared synchronous memory without arbitration; and
   arbitrating said non-super agents for access to said shared synchronous memory, and individually routing address, data, and clock signals from said super agent and said non-super agents to said shared synchronous memory, and monitoring said super agent's access to said shared synchronous memory for a determination of an availability of an open window, wherein said open window may exist when said super agent does not access said shared synchronous memory, when said super agent's access to said shared synchronous memory has stalled, when a bus conflict exists, and when a halt signal or power down signal exists in said super agent.

10. The method of sharing synchronous memory among a plurality of agents according to claim 9, wherein:
    said arbitrated access of said non-super agents to said shared synchronous memory is allowed during an extended access of said super agent to said shared synchronous memory.

11. The method of sharing synchronous memory among a plurality of agents according to claim 10, wherein:
    said arbitrated access of said non-super agents is allowed during said extended access of said super agent when caused by a wait state.

12. The method of sharing synchronous memory among a plurality of agents according to claim 10, wherein:
    said arbitrated access of said non-super agents is allowed during said extended access when caused by a power down mode of said super agent.

13. The method of sharing synchronous memory among a plurality of agents according to claim 10, wherein:
    said arbitrated access of said non-super agents is allowed during said extended access when caused by a halt mode of said super agent.

14. Apparatus for sharing synchronous memory among a plurality of agents, comprising:
- means for assigning one of said plurality of agents super agent status;
- means for assigning the others of said plurality of agents non-super agent status;
- means for routing address, data, and clock signals from said super agent and said plurality of non-super agents to said shared synchronous memory;
- means for allowing said super agent to access directly said shared synchronous, memory without arbitration; and
- means for arbitrating said non-super agents for access to said shared synchronous memory;
- wherein said means for arbitrating monitors said super agent's access to said shared synchronous memory for a determination of an availability of an open window, wherein said open window may exist when said super agent does not access said shared synchronous memory, when said super agent's access to said shared synchronous memory has stalled, when a bus conflict exists, and when a halt or power down signal exists in said super agent.

15. The apparatus for sharing synchronous memory among a plurality of agents according to claim 14, wherein:
- said means for arbitrating allows access of said non-super agents to said shared synchrohous memory during an extended access of said super agent to said shared synchronous memory.

16. The apparatus for sharing synchronous memory among a plurality of agents according to claim 15, wherein:
- said means for arbitrating allows access of said non-super agents during wait states in an access by said super agent.

17. The apparatus for sharing synchronous memory among a plurality of agents according to claim 15, wherein:
- said means for arbitrating allows access of said non-super agents during said extended access when caused by a power down model of said super agent.

18. The apparatus for sharing synchronous memory among a plurality of agents according to claim 15, wherein:
- said means for arbitrating allows access of said non-super agents during said extended access when caused by a halt mode of said super agent.

* * * * *